United States Patent

Anderson

[15] 3,688,534
[45] Sept. 5, 1972

[54] BENT TUBE INSPECTION METHOD AND APPARATUS

[72] Inventor: Gunnar P. Anderson, Danbury, Conn.

[73] Assignee: United Aircraft Corporation, East Hartford, Conn.

[22] Filed: Nov. 23, 1970

[21] Appl. No.: 92,103

[52] U.S. Cl. ..................................................72/32
[51] Int. Cl. .............................................B21c 51/00
[58] Field of Search.....72/32, 31, 33, 34, 35; 33/1 C, 33/1 N, 1 L; 73/156

[56] References Cited

UNITED STATES PATENTS

| R26,467 | 10/1968 | Lance............................72/32 |
| 3,387,473 | 6/1968 | Noordhoek et al............72/22 |
| 3,336,776 | 8/1967 | Zerlaut..........................72/14 |

*Primary Examiner*—Charles W. Lanham
*Assistant Examiner*—Michael J. Keenan
*Attorney*—Maurice B. Tasker and Vernon F. Hauschild

[57] ABSTRACT

A conventional tube bending machine is disclosed including a longitudinal bed along which a head is movable. The head has a rotatable spindle provided with a tube holding chuck and a protractor dial which indicates in degrees the angular rotation of the spindle about the tube axis at which successive bends in the tube are made at spaced points along the tube. The protractor dial is fitted with two dowel pins for positioning a smaller paper protractor dial in registry with the head dial. As the tube is rotated about its axis and is clamped at each bend position along the tube, a switch is operated which energizes a solenoid and moves a numbered, self-indexing stamping head against the paper dial to print thereon the number of the bend being made at the corresponding angular position at which the bend is made. The paper dial is removed at the completion of the bending operation and is attached to the tube for inspection purposes, enabling the inspector to determine the number of degrees the tube was rotated about its longitudinal axis at consecutive bends.

16 Claims, 4 Drawing Figures

PATENTED SEP 5 1972

INVENTOR
GUNNAR P. ANDERSON
BY M. B. Tasker
ATTORNEY

BENT TUBE INSPECTION METHOD AND APPARATUS

BACKGROUND OF THE INVENTION

In an aircraft, many sections of metal tubing are utilized for hydraulic lines, fuel lines etc. and each piece of tubing is usually formed with a plurality of bends at precise locations along its length and at varying positions of angular displacement about the longitudinal axis of the tube. It is extremely important that both the angular and the lengthwise positions of the bends be accurately located to accommodate other aircraft components.

Precision bending equipment is available to perform the bending operations accurately, but inspection of the finished bent tube has created problems because of the complex nature of the parts. Ordinary inspection methods can be used to check the distances between bends and the degree of bend imparted but the angular location of the bends relative to the longitudinal axis of the tube presents real difficulties because in the finished tube there is little if any of the original straight tube which can be used as a reference from which to make measurements.

It has been conventional procedure, therefore, to make a master piece for each of the numerous tubes used in each aircraft so that subsequent production pieces can be compared with the master. This is not an easy inspection procedure but it was the best available for many years. This practice was not only awkward and time consuming but the storage of the large numbers of crooked tubes presented problems. They are of easily bent materials and even slight damage in storage and use, if undetected, could result in a large number of unacceptable production pieces.

SUMMARY OF THE INVENTION

It is an object of this invention to provide a novel tube inspection method and apparatus which eliminates the use of master tubes and the problems attendant upon their storage and use.

It is another object of this invention to provide a method an apparatus for producing a permanent record of the angular position of the tube as it is rotated about its longitudinal axis into each bend location along its length.

A further object of this invention is to provide a printed record on a protractor dial of the angular position of the tube as it is rotated about its original longitudinal axis into each bend location.

A still further object of this invention is to provide such a printed record on a detachable protractor dial which can be attached to the bent tube as a permanent record for inspection purposes.

A yet further object of this invention is to provide a tube bending machine having a self-indexing printing mechanism for stamping the number of each successive bend on a paper protractor dial attached to the rotatable head of the machine at the angular position of the head at which each bend is made.

A further object of this invention is generally to improve bent tube inspection methods and apparatus.

DESCRIPTION OF THE PREFERRED EMBODIMENT

Figure 1:
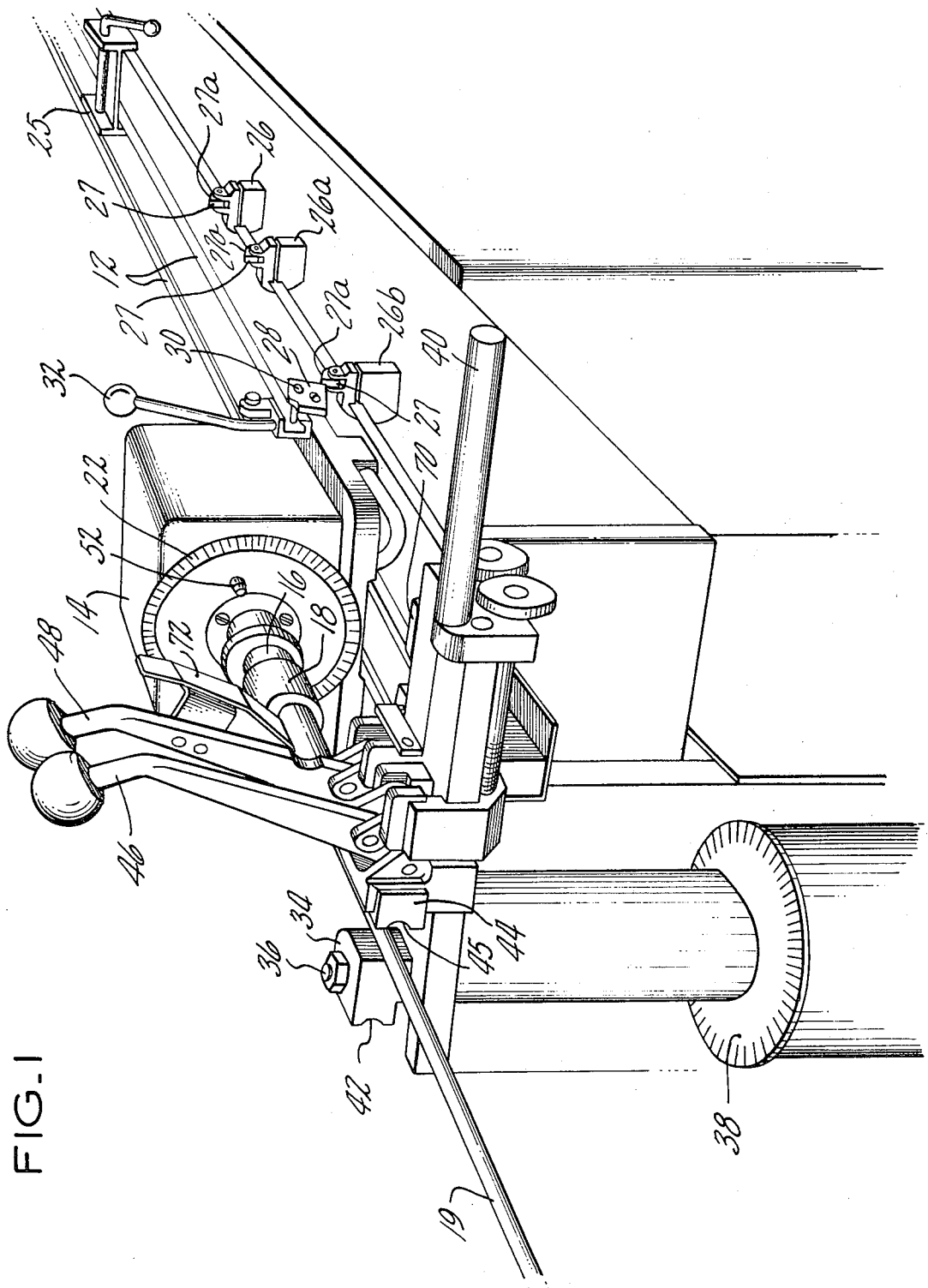
FIG. 1 is a perspective view of a conventional tube bending machine equipped for the practice of this invention with the head in position for the last bend.
Figure 2:
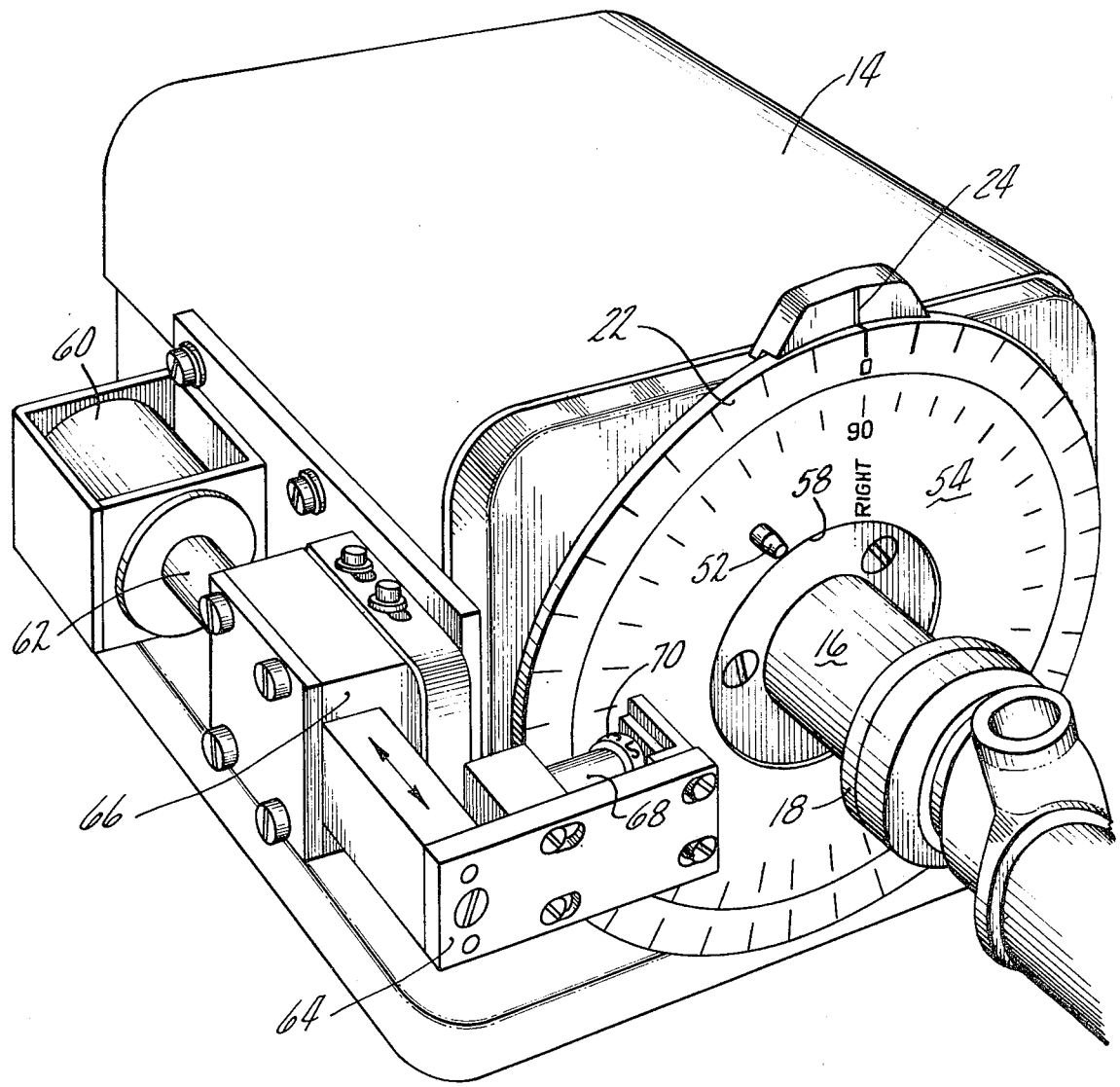
FIG. 2 is an enlarged perspective view of the protractor head of the machine showing the paper dial in place and the solenoid operated stamping head.
Figure 3:
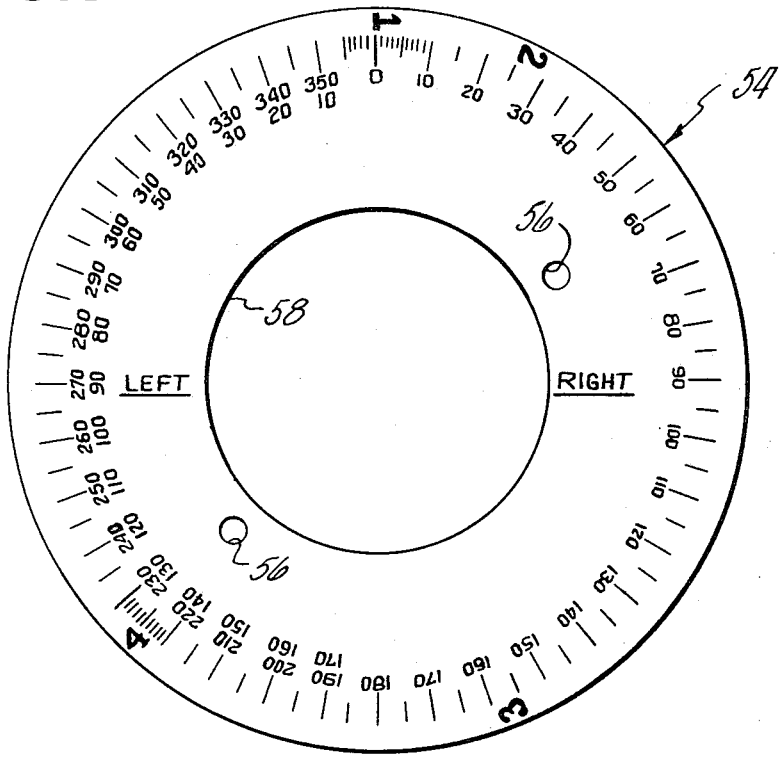
FIG. 3 is a full size view of a paper dial following a tube bending operation involving four bends.

Referring first to FIG. 1, 10 is the bed of a conventional tube bending machine having ways 12 on which is mounted a head 14 in which a spindle is journaled. Spindle 16 carriers a tube holding chuck 18 which is shown herein as a collet type chuck in which a tube 19 is clamped. Spindle 16 has a protractor dial 22 fixed thereto which is marked in degrees reading in a clockwise direction. These degree markings cooperate with a fixed reference mark 24 on head 14 (FIG. 2).

For purposes of illustration, the machine is set up to make four bends in tube 19. Bed 10 has a stop 25 adjustable along the bed which is the stop against which head 14 abuts for the first bend. The bed also carries a series of stops 26, 26a and 26b, each having a stop face 27. These are adjustable along the bed 10 and cooperate with an abutment 28 on the head. Abutment 28 can be rotated about pivot 30 to clear stops 26, 26a, and 26b and allow the head to be moved by handle 32 along ways 12. It will be understood that there will be as many stops as there bends to be made in the tube. The machine shown has nine of these stops 26 of which only three are shown herein in order to clarify the drawing, this being the number required to make four bends in the tube.

Figure 4:
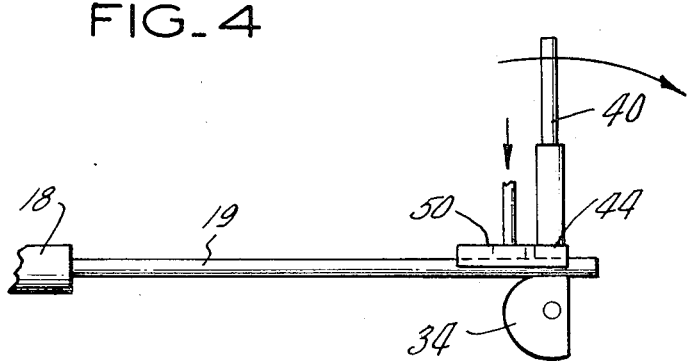
FIG. 4 is a diagrammatic illustration of a tube held in the machine chuck and clamped, ready for the first bend.

Usual tube bending mechanism at the front end of the machine includes a bending die 34 on the upper end of a shaft 36 which is journaled in the bed structure of the machine. Shaft 36 has fixed to it a protractor dial 38 which indicates the angle through which the die is rotated by bend handle 40. The face of bending die 34 has a semicircular groove 42 struck on a radius equal to the cross-sectional radius of the tube to be bent. Opposite the grooved face of the bending die 34 is a tube clamping member 44 with a complimentary groove 45 (FIG. 1). Member 44 is moved toward and away from die 34 by a tube clamping lever 46. A similar back-up lever 48 moves a follower die 50 into supporting position against the tube being bent (FIG. 4).

The machine shown is a Leonard Tube Master, Model 10, manufactured by Leonard Precision Products Company, Santa Ana, Calif., and when set up for a tube bending operation the operator has only to position the head abutment 28 against stops 25, 26, 26a and 26b in succession and operate the levers 46, 48 and 40 at each bend position. It will be understood, however, that the present invention can be practiced on any machine which does not have these automatic features.

In accordance with the present invention, dial 22 is provided with two locating pins 52 at the right and left of the spindle for positioning a removable protractor dial 54 which has holes 56 to receive pins 52 and a large central aperture 58 to receive the spindle 16. Dial 54 may be of paper or any other inexpensive material and is sufficiently smaller in diameter than dial 22 on the machine head so that the concentric markings on the two dials are adjacent and visible. To insure that the smaller diameter 54 is properly located relative to dial 22 with the angle scales in the desired relation, the smaller dial is marked "Left" and "Right" adjacent holes 56.

Mechanism is provided to print successive numbers on dial 54 as a series of bends are performed on the tube. To this end a solenoid including a winding 60 and a core 62 is mounted on the left-hand side of machine head 14 (FIG. 2) which reciprocates a frame 64 slidably mounted in a bearing 66 also mounted on the head. The frame carries a self-indexing stamping head 68 located in front of dial 54. The stamping head has an annular flange 70 bearing raised numerals 1 – 0 about it periphery which permanently stamps the number corresponding to the bend being made on paper dial 54 at the exact angular position thereon at which the bend was made. The stamping head can be self-inking, but preferably dial 54, made from pressure sensitive paper, can be used without the ink.

It will be understood that the reciprocation of the stamping head could be done manually, but herein the coil 60 of the solenoid is energized by the closing of its circuit when lever 48 is moved clockwise to advance back-up plate 50. To effect this result a micro-switch 70 is mounted on the machine frame at the rear of the bend handle in position to be engaged and closed by a switch operating member 72 fastened to lever 48.

To bend a tube, the straight tubular blank is inserted in collet chuck 18 and clamped firmly therein for the duration of the bending operation. For purposes of description it will be assumed that the bend schedule calls for bends to be made at four points along the tube 0°, 25°, 155°, and 222° respectively on dial 22. Abutment 28 is raised to clear stops 26c, 26b, 26a as head 14 is moved rearwardly on machine ways 12 until it contacts stop 25. This is the first bend position on the head. Spindle 16 is then rotated until the 0 on dial 22 is in register with mark 24 on head 14. Ring 70 of stamping head 68 is turned to bring numeral 1 into printing position. At this point it should be noted that dial 54 is located a quarter turn counterclockwise relative to dial 22 so that 90° on this paper dial registers with 0° on machine dial 22. This brings the 0° position on dial 54 opposite the numeral 1 position on stamping ring 70.

The tube is now in position for the first bend and accordingly lever 46 is rotated clockwise (FIG. 1) to clamp the tube between die 34 and clamping member 44. Lever 48 is next moved similarly to move follower die 50 against the tube. Near the end of the movement of lever 48 switch operating member 72 engages and closes switch 70 which energizes solenoid 60 and moves core and frame 64 to the rear (FIG. 2) causing stamping head 68 to impress the numeral 1 at the 0° position on dial 54. The operator next moves bend lever 40 as far as it will go in a forward direction (clockwise as viewed from above in FIG. 1). It will be understood that if a wholly manually operated machine were used the operator would move the bend lever while watching protractor dial 38 to provide the correct angle of bend. This completes the initial bend which is always made at the 0° position on dial 22.

The tube is next released by returning levers 46 and 48 to their FIG. 1 positions which releases the tube at die 34 and permits head 14 to be pulled in a forward direction to the second bend position of the head in which abutment 28 engages face 27 of stop 26. During this forward movement of head 14, abutment 28 rides over inclined surface 27a of stop 26. Spindle 16 is now rotated to bring 25° on dial 22 opposite mark 24 on the head. With the abutment 28 held against face 27 of stop 26 the tube is again clamped by lever 46 and follower die 50 is advanced by lever 48. The second bend is now recorded on dial 54 by numeral 2 on stamping head ring 70 at 25° on dial 54.

This sequence is repeated with the abutment 28 engaging stop 26a and dial 22 set at 155° for the third bend, and with abutment 28 engaging stop 26b and dial 22 set at 222° for the fourth bend. The tube is then removed from collet 18 and dial 54 is removed from pins 52 and attached to the finished tube, serving as a record that the formed tube has been properly bent at the correct angles of rotation about its original longitudinal axis.

The inspector can readily check the location of each bend along the length of the tube and the degree of bend imparted at each position with conventional equipment. What he cannot check is the angular position at which each of the four bends was made, i.e., the angle indicated on dial 54 for each bend. This is practically impossible because all that remains of the straight tube blank is frequently what was clamped in the collet.

What is claimed is:

1. The method of operating a tube bending machine of the type having a spindle, a tube holding chuck on the spindle, and a protractor dial for the spindle, which consists in attaching a removable protractor dial to the protractor dial of the spindle in register with the latter dial, moving the spindle with a tube chucked therein axially and rotating it to the desired angle to bring the tube into successive bend locations, and making an impression on said removable dial at each bend location indicating the number of the bend and the rotational angle at which the bend was made.

2. The method of operating a tube bending machine of the type having a spindle, a tube holding chuck on the spindle, a protractor dial for the spindle, and a die for bending a tube, which consists in removably attaching a paper protractor dial to the protractor dial on the spindle in register with the latter dial, moving the spindle with a tube chucked therein axially and rotating it to the desired angle to bring the tube into the first bend position, clamping the tube against the bending die of the machine with the protractor dial of the machine at 0°, making an impression on the paper dial at 0° to indicate the first bend, making the first bend, releasing the tube at the bending die, moving the spindle to the next longitudinal and rotational position of the tube for the second bend, clamping the tube, making an impression on said paper dial to indicate the second bend at the new angle position on the removable dial, making the second bend, and repeating these steps for each successive bend along the length of the tube.

3. The method of operating a tube bending machine of the type having a spindle, a tube holding chuck on the spindle, and a protractor dial for the spindle, which consists in clamping the tube in the spindle, attaching a removable protractor dial to the face of said spindle dial, and moving a self-indexing stamping head against the face of said removable dial at each bend position along the tube to impress the bend number at the degree position on said removable dial which corresponds to the degree reading of said machine dial.

4. The method of operating a tube bending machine of the type having a spindle, a tube holding chuck on the spindle, and a protractor dial for the spindle, which consists in clamping the tube in the spindle, mounting a removable protractor dial on the machine marked in degrees corresponding to the dial on said spindle protractor and rotated in unison therewith, and moving a self-indexing stamping head against the face of said removable dial at each bend location along said tube to impress successive numbers on the latter at degree markings thereon corresponding to the degree markings on said spindle dial.

5. The method of operating a tube bending machine of the type having a spindle, a tube holding chuck on the spindle, a protractor dial for the spindle, and a die for bending a tube, which consists in removably attaching a recording protractor dial on the machine in register with the spindle dial and rotatable in unison therewith, moving the spindle head relative to the bending die of the machine to bring the tube to the first bend position along the length of the tube, rotating the spindle to bring the protractor dials to their 0° positions, clamping the tube at the bending die, making an impression on said recording dial at the 0° position thereon to indicate the first of a series of bends, making the bend, releasing the tube at the bending die, moving the tube axially to the second bend location, rotating the spindle to the desired angular position on said machine dial for the second bend, clamping the tube, making an impression on said recording dial at the new angle position to indicate the second bend, making the second bend, releasing the tube at the die and repeating these steps at each bend location along the tube to produce a record on the recording dial of the successive bends and the rotational angle of the tube at each bend.

6. The method of operating a tube bending machine of the type having a bed, a head movable along said bed including a spindle having a tube holding chuck and a protractor dial for the spindle, a tube bending die, a tube clamping lever, a back-up lever, and a tube bending arm, including the steps of removably attaching a protractor dial to the spindle dial in register with the latter, securing a tube in the chuck, moving the head along the bed to bring said tube into the first bend position, positioning said machine dial at its 0° position, operating said levers to clamp the tube against said die, impressing the first of a series of identification symbols, such as numerals, on said paper dial at the 0° position thereon, making the first bend, releasing the tube by moving said levers, moving said head forward to bring said tube into the second bend position, rotating said spindle to the correct angular setting on said machine dial, moving said levers to clamp said tube against said die, impressing the second symbol on said paper dial at the new angular position of said tube, making the second bend, releasing the tube, repeating the above steps until all the bends have been made in the tube, and removing the paper dial.

7. The method of operating a tube bending machine of the type having a spindle, a tube holding chuck on the spindle, and a protractor dial rotatable with the spindle including the steps of mounting a removable protractor dial on the machine in register with said spindle protractor dial and movable in unison therewith, impressing on said removable dial the number of each successive bend made in the tube at the correct angular position of the tube as the latter is rotated about its longitudinal axis, and removing the numbered dial and the tube from the machine.

8. A tube bending machine having an elongated bed, a head movable along said bed having a spindle and a chuck on said spindle for holding a tube to be bent, a protractor on said head including cooperating stationary and movable markings, one of which is a dial and one of which is rotatable with said spindle, means on said head for positioning a removable protractor dial in register with said first mentioned dial, means for making successive impressions on said removable dial indicating a series of bends at spaced points along the length of said tube and at various angular positions of rotation of said spindle including a stamping head having means in front of said removable dial for making an impression on the latter, and means for moving said stamping head to bring said impression making means into engagement with said removable dial at each of said bend positions.

9. A tube bending machine including an elongated bed, a head movable along said bed having a rotatable spindle, a chuck on said spindle for holding a tube to be bent at spaced points along its length and at different angular positions of rotation of said spindle, said head having a protractor dial rotatable with said spindle, means for positioning a removable dial in register with said head dial, and means including a stamping head carried by said machine head for making progressive impressions on said removable dial at a series of angular positions corresponding to the angular positions of said head dial at the successive bend points on said tube.

10. A tube bending machine including an elongated bed, a head movable along said bed having a rotatable spindle, a chuck on said spindle for holding a tube to be bent at a series of spaced points along its length and at different angular positions of rotation on said spindle, a protractor on said head having a dial rotatable with said spindle, means on said head for positioning a removable dial and for rotating it in unison with said first mentioned dial, means carried by said head for making an impression on said removable dial at each angular position of said spindle as the latter is rotated into successive bend positions including a stamping head having a ring provided with a progressive series of markings thereon, means for moving said stamping head toward said removable dial at each bend position, and means for indexing said ring following each operation of said stamping head.

11. A tube bending machine including an elongated bed, a head movable along said bed having a spindle, a chuck on said spindle for holding one end of a tube to be bent at spaced points along it length and at various angular positions of rotation about its longitudinal axis, a protractor on said head including stationary and movable elements, one of which is rotatable with said spindle, a removable protractor dial rotatable with said rotatable element, and means on said head for marking said removable dial at each bend point along said tube including a reciprocable stamping head having a numbered ring located in front of said removable dial.

12. A tube bending machine including an elongated bed, a head movable along said bed having a rotatable spindle, a chuck on said spindle for holding a tube to be bent at spaced points along its length and at various angular positions of rotation about its longitudinal axis, a protractor dial on said spindle rotatable with the latter, means for positioning a removable paper dial on said spindle dial in register therewith, and means on said head for impressing successive indicia on said paper dial at the angular positions on the latter at which bends are made in the tube.

13. The tube bending machine of claim 12 in which the positioning means for the removable dial consists of a plurality of pins on the face of the machine dial which are received in matching holes in the removable dial.

14. The tube bending machine of claim 12 in which the means for impressing indicia on the removable dial includes a reciprocable stamping head carried by the machine head including a serially numbered ring located in front of the removable dial at the angular reading on said dial which corresponds to the angular reading on said spindle dial.

15. The tube bending machine of claim 14 in which the stamping head is reciprocated by a solenoid and the numbered ring is self-indexing following each operation of the stamping head.

16. The tube bending machine of claim 15 in which the solenoid for operating the stamping head is energized automatically during each bending operation performed on the tube.

* * * * *